UNITED STATES PATENT OFFICE.

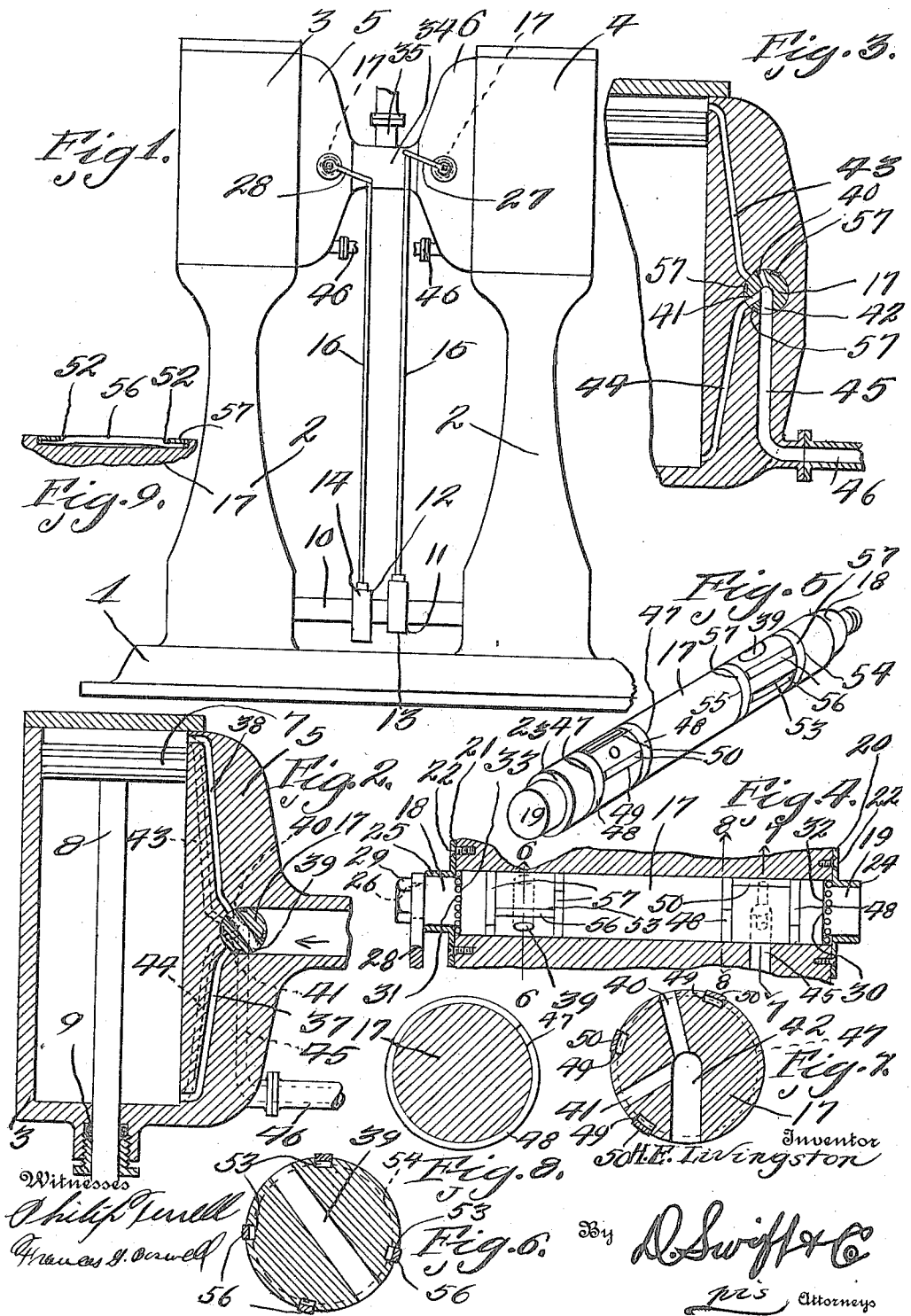

HERBERT E. LIVINGSTON, OF TALOGA, OKLAHOMA.

OSCILLATORY VALVE MECHANISM FOR ENGINES.

1,180,163.  Specification of Letters Patent.  Patented Apr. 18, 1916.

Application filed May 21, 1915. Serial No. 29,514.

*To all whom it may concern:*

Be it known that I, HERBERT E. LIVINGSTON, a citizen of the United States, residing at Taloga, in the county of Dewey and State of Oklahoma, have invented a new and useful Oscillatory Valve Mechanism for Engines; and I do hereby declare the following to be a full, clear, and exact description of the invention, such as will enable others skilled in the art to which it appertains to make and use the same.

This invention relates to an oscillatory valve mechanism for steam engines for controlling or governing the intake and exhaust, and an object of the invention is to provide an oscillatory cylindrical valve having annular split packing rings upon each side of each of the valve openings of the valve, and provided with longitudinally extending spring packing strips mounted in recesses of the cylindrical valve and interposed in the valve openings, the ends of said longitudinal strips underlying the annular rings. The annular split packing rings constitute means not only to act as packing, but also means to hold the longitudinal strips in place when the valve is removed.

Another object of the invention is to provide ball bearings for the opposite ends of the valve, there being sleeved plates to receive the reduced ends of the valve to prevent axial movement of the valve and to hold ball bearings in place.

A further object of the invention is to provide a mechanism of this nature, which is simple, efficient and practical in construction.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in elevation of a vertical multiple cylinder steam engine, showing the improved oscillatory valve mechanism applied. Fig. 2 is an enlarged vertical sectional view through one of the cylinders, disclosing the oscillatory valve, showing the valve adjusted for an inlet of steam. Fig. 3 is a vertical sectional view, showing the valve adjusted to permit an exhaust of steam. Fig. 4 is a transverse sectional view of the valve casing, showing the oscillatory valve in elevation. Fig. 5 is a view of the oscillatory valve in perspective and removed. Fig. 6 is a sectional view on line 6—6 of Fig. 4, showing the longitudinally extending packing strips. Fig. 7 is a sectional view on line 7—7 of Fig. 4 showing the longitudinally extending spring packing strip and the different ports. Fig. 8 is a sectional view on line 8—8 of Fig. 4, showing the annular spring split rings. Fig. 9 is a detail fragmentary section of a longitudinal portion of the valve showing the annular spring split rings and the longitudinally extending packing strip.

Referring to the drawings, 1 designates the base of the engine, rising from which are the engine frames 2 having the piston cylinders 3 and 4, which are provided with the valve casings 5 and 6. The cylinders 3 and 4 are designed to have the usual piston, such as indicated at 7, only one being illustrated. The piston rod 8 is connected to the piston 7 and passes through a conventional form of packing gland or box 9, and is designed to have suitable connections (not shown) with the shaft 10, which is provided with suitable eccentrics 11 and 12 having the usual eccentric straps 13 and 14, to which the eccentric rods 15 and 16 are connected. Each of the valve casings 5 and 6 is provided with a cylindrical oscillatory or rocking valve 17, and each end of each valve is reduced at 18 and 19. The ends of the valve casings have plates 20 and 21 secured at 22. The plate 20 has a sleeve extension 24 to receive the reduced end 19, whereas the plate 21 has a sleeve extension 25 to receive the reduced part 18, which reduced part 18 has an extension 26 shown in dotted lines in Fig. 4, and on each extension 26 an arm as shown at 27 and 28 is secured by the nut 29, so as to rotate with the valve. Each of the arms 27 and 28 are connected to the eccentric rods 15 and 16, so that as the shaft 10 is rotated, the eccentrics 11 and 12 through the medium of the eccentric straps 13 and 14 will impart movement to the rods 15 and 16, thereby causing the rods to oscillate the valve accordingly. Antifrictional ball bearings 30 and 31 are interposed between the shoulders 32 and 33 of the end portions of the valve 17 and said plates 20 and 21, so as to permit the valve to easily rock.

The valve casings 5 and 6 are connected by the hollow connection 34, into which the steam from any suitable source of supply (not shown) is carried, by means of the pipe 35.

The valve casings 5 and 6, only one being shown, are provided with the steam inlet ducts 37 and 38 with one or the other of which the steam inlet port 39 of the valve 17 registers, so that the steam will enter first on one side of the piston 7 and then on the other, when the valve 17 is operated accordingly. The other end of the rocking valve 17 is provided with two exhaust ports 40 and 41 merging into a single exhaust port 42.

The casings 5 and 6, only one being shown in sections, as in Figs. 2 and 3 are provided with exhaust ports 43 and 44. It is to be noted that the ports 43 and 44 should be directly behind the ducts 37 and 38, but are shown in dotted lines in the manner shown in Fig. 2, so as to be illustrated. Just before the port 39 registers with the inlet duct 38, the port 40 moves past the exhaust duct 43, subsequently to which, the port 39 registers with the inlet duct 38, allowing steam to enter through the duct or passage 38 above the piston, and remains in such position, until the piston 7 almost reaches the bottom of the cylinder, thereby exhausting the steam through the passage or duct 44, the port 41, and thence through the port 42 and the passage 45 and through the pipe 46. The valve 17 is then oscillated so that the port 41 is moved past the passage or duct 44, after which the port 39 registers with the passage 37 allowing steam to enter below the piston 7, the utilized steam above the piston exhausting in a similar manner as before stated, but only through the passage 43 and the port 40.

The valve 17 is provided with annular recesses 47 at one end, in which the split packing rings 48 are seated, and between the annular recesses or grooves 47 the valve is provided with longitudinal recesses 49 to receive the straight spring strip 50 having their ends recessed as at 52 to engage under the rings 48. These strips 50 are interposed between the ports 40, 41 and 42, and the rings 48 and 49 are arranged, one upon each side of the ports 40, 41 and 42. The end of the valve 17 having the port 39 is provided with similar longitudinal and annular recesses 53 and 54 and 55, to receive similar longitudinal strips 56 and annular split rings 57, which strips and rings together with the other strips and rings constitute packing means for the valve 17.

The invention having been set forth, what is claimed as new and useful is:—

In combination with a steam engine having a piston cylinder, a piston including a rod mounted in the cylinder, said cylinder having inlet and exhaust passages leading from each end thereof, a dominant inlet, a dominant exhaust, a cylindrical oscillatory valve having an inlet port at one end to register with first one and then the other of the first inlet passages to control the steam through the dominant inlet, said valve at its other end having exhaust ports to register with first one then the other of the first exhaust passages, and provided with an additional port to register with the dominant exhaust port, when one or the other of said exhaust ports is in registration with one or the other of the exhaust passages.

In testimony whereof I have signed my name to this specification in the presence of two subscribing witnesses.

HERBERT E. LIVINGSTON.

Witnesses:
C. K. CARY,
DAPHNE CARY.